United States Patent [19]

Herwig

[11] 4,229,799
[45] Oct. 21, 1980

[54] METHOD AND APPARATUS FOR MEASURING AREA TRAVERSED BY VEHICULAR IMPLEMENT

[75] Inventor: Warren E. Herwig, Wind Lake, Wis.

[73] Assignee: Allis-Chalmers Corporation, Milwaukee, Wis.

[21] Appl. No.: 27,988

[22] Filed: Apr. 9, 1979

[51] Int. Cl.³ .............................................. G01B 7/32
[52] U.S. Cl. .................................. 364/564; 364/560; 33/123
[58] Field of Search ........................... 364/560, 564; 235/92 DN, 92 DM; 33/121, 122, 123, 124

[56] References Cited

U.S. PATENT DOCUMENTS

| 3,652,842 | 3/1972 | Lewin | 33/123 |
| 3,865,486 | 2/1975 | Miles et al. | 33/123 |
| 3,928,751 | 12/1975 | Fathauer | 235/92 DN |
| 4,058,712 | 11/1977 | Bachman | 364/564 |
| 4,093,107 | 6/1978 | Allman et al. | 364/564 |

Primary Examiner—Charles E. Atkinson
Assistant Examiner—Gary Chin

Attorney, Agent, or Firm—Lee H. Kaiser

[57] ABSTRACT

A system for indicating area traversed by a vehicular implement has a ground speed sensor for generating ground speed pulses at a frequency which is a function of the implement ground speed; a pulse generator for deriving fixed width pulses from said ground speed pulses; an integrator for accumulating the fixed width pulses to derive a positive slope dc signal whose instantaneous magnitude is an analog of distance traveled by the implement; a comparator for comparing the analog signal to a reference signal whose magnitude is an inverse function of the width of path traversed by the implement and for providing an output signal when the former becomes equal to the latter, whereby the output signal indicates that the implement has traversed an area equal to the distance traveled multiplied by the path width; and a counter for registering and displaying the number of output signals as an indication of area traversed. Preferably the width of the pulses applied to the integrator can be selectively varied by the implement operator to compensate for difference in gear ratios or wheel and tire sizes of different implement models.

14 Claims, 1 Drawing Figure

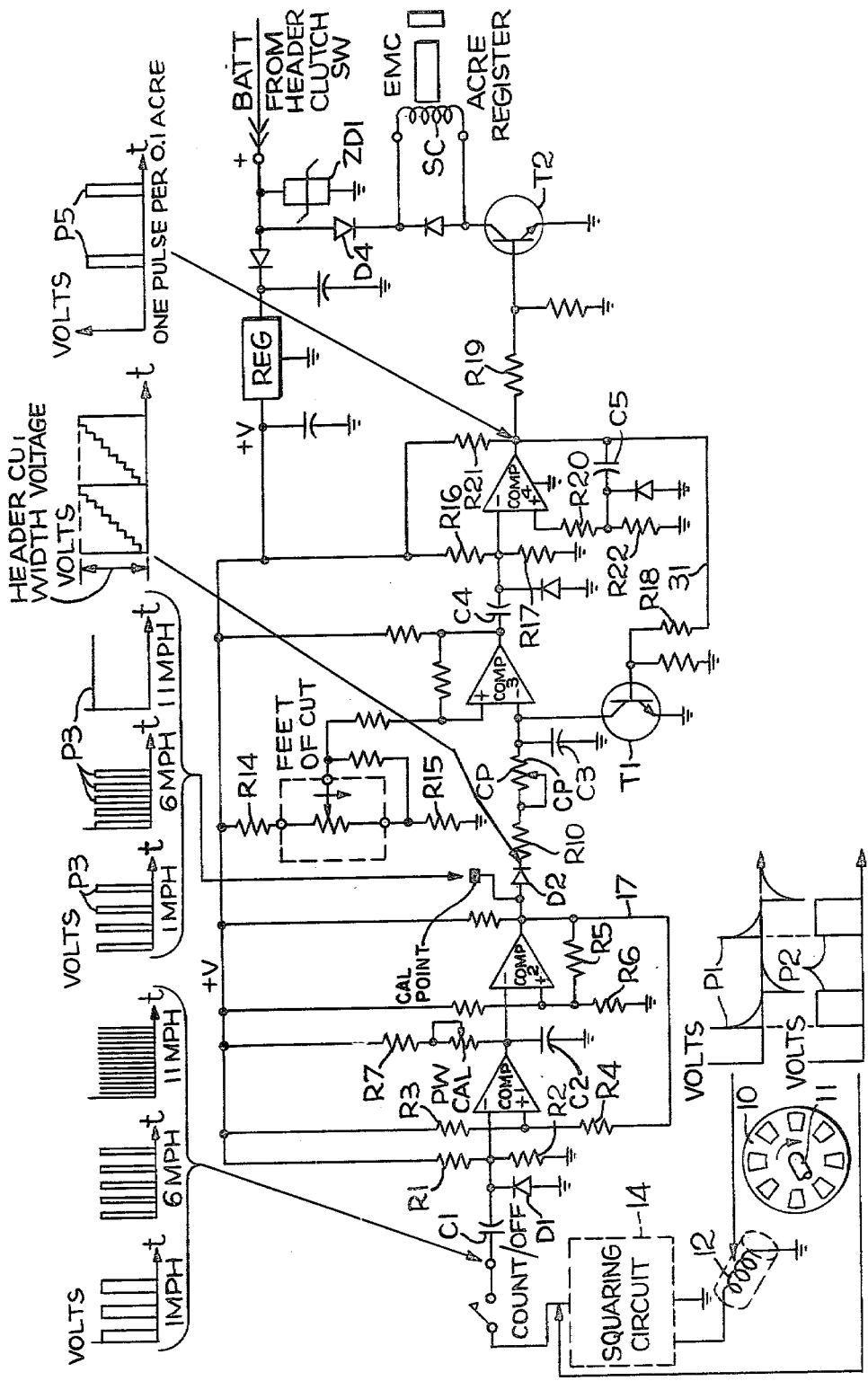

METHOD AND APPARATUS FOR MEASURING AREA TRAVERSED BY VEHICULAR IMPLEMENT

BACKGROUND OF THE INVENTION

This invention relates to the measurement of the area traversed by a wheeled farm implement such as a seed planter, a spreader, or a combine and, more particularly, to an electrical system for indicating to a farmer the number of acres farmed by a vehicular implement.

A farmer is interested in the number of acres farmed when he is operating a tractor to pull a planter, a sprayer, a spreader, or a combine, or when he is operating such a vehicular implement of the self-propelled type, since the acreage farmed is an aid in controlling the density of liquid sprayed, or the seed population, or in determining the bushels per acre of crop harvested. The mileage indicated on the tractor odometer can be used to roughly estimate the area farmed, but this necessitates human estimating, is inconvenient to the farmer, and is of doubtful accuracy.

Electronic digital area calculators are also known of the type disclosed in U.S. Pat. No. 4,058,712, but they involve complex electrical circuits, are expensive, and are prone to reliability problems.

It is therefore an object of the invention to provide an improved system for indicating the area traversed by a wheeled agricultural implement which is less expensive and simpler in construction than known area indicators of the electronic digital type.

It is a further object of the invention to provide an improved area calculator for use on a vehicular agricultural implement which can be easily calibrated to different implement widths, to different transmission gear ratios, and to different wheel and tire sizes.

Still another object is to provide an improved method for indicating area traversed by a vehicular implement which is simpler than prior art methods.

SUMMARY OF THE INVENTION

The method of indicating the area traversed by a vehicular implement, in accordance with the invention, includes the steps of: (a) generating a train of ground speed pulses at a frequency which is a function of the ground speed of the implement; (b) integrating said pulses to derive a positive slope analog electrical signal whose instantaneous magnitude is representative of the distance traveled by the implement; (c) providing a reference voltage whose magnitude is an inverse function of the width of the implement; (d) comparing the magnitude of the analog electrical signal to the reference voltage and providing an output pulse when the former becomes equal to the latter, whereby the output pulse indicates that the implement has traversed an area equal to the distance traveled multiplied by the implement width; (e) repetitively performing the integrating step starting from zero each time the output pulse occurs; and (f) counting the number of output pulses as an indication of the area farmed by the vehicular implement.

The system in accordance with the invention for measuring and indicating area traversed by a vehicular implement includes: (a) pulse generating means for deriving a train of ground speed pulses at a frequency which is a function of the implement ground speed; (b) means including a resistance in series with a capacitance for integrating the ground speed pulses to derive a positive slope analog electrical signal whose instantaneous magnitude is indicative of the distance traveled by the implement; (c) means for providing a reference signal whose magnitude is an inverse function of the width of path traversed by the implement; (d) a comparator for comparing the magnitude of the analog signal to the reference signal and for providing an output pulse when the former becomes equal to the latter, whereby the output pulse indicates that the implement has traversed an area equal to the distance traveled multiplied by the width of path; (e) means responsive to the output pulse for discharging the integrating capacitance; and (f) a counter for counting and displaying the number of output pulses as an indication of the area traversed by the implement.

In a preferred embodiment, a pulse generator between the ground speed pulse generating means and the integrating means derives fixed width pulses at the ground speed pulse frequency, and means are accessible to the operator for selectively varying pulse width to thereby compensate for differences in transmission gear ratios between different implement models and for differences in size of the wheels or the tires on different models of implements. The preferred system also has means to selectively vary the magnitude of path width reference signal to thereby permit calibration for different implement widths.

BRIEF DESCRIPTION OF THE DRAWING

The above and other objects and advantages of the invention will be more readily apparent from consideration of the single FIGURE of the drawing which is a schematic electrical circuit diagram of a preferred embodiment of area indicating system adapted to generate an output pulse to advance an electromagnetic counter one count each time an agricultural combine has traversed 0.1 of an acre.

DETAILED DESCRIPTION OF A PREFERRED EMBODIMENT

Referring to the single FIGURE of the drawing which illustrates the invention as incorporated on a self-propelled combine, a train of "spike" pulses p1 indicative of the ground speed of the combine is generated by a ground speed sensor schematically shown as including a toothed ferromagnetic wheel 10 mounted on a shaft 11 in the final drive of the combine transmission and spaced by a small air gap from a reluctance pick-up coil 12 so that its reluctance decreases each time a tooth of wheel 10 is opposite coil 12 to generate a ground speed "spike" pulse p1. The number of ground speed pulses generated by the ground speed sensor per foot of travel of the combine may vary over a wide range dependent upon the wheel size and the gear ratio of the combine transmission. Spike pulses p1 may be applied to a conventional squaring circuit 14 (shown in block form in dotted lines to indicate that it is optional) which derives a square pulse p2 from the positive half cycle of each spike pulse p1. Either pulses p1 or p2 may be applied through a COUNT/OFF switch and ac-coupled through a capacitor C1 to a 0.1 acre counting circuit described hereinafter, and COUNT/OFF switch is preferably accessible to the combine operator to permit selection of whether or not ground speed pulses are to be accumulated as an indication of acres harvested by the combine. In alternative combine models the COUNT/OFF switch is interlocked, or automatically controlled so that, for example, it is open so that ground speed pulses are not accumulated when the combine header is lifted and grain is not being harvested. The negative-going half cycle of ground speed pulses p1 are clipped by a diode D1.

The frequency of the input pulses p1 or p2 coupled through capacitor C1 is a function of combine ground speed, and such pulses are schematically represented for combine ground speeds of one mile per hour (mph), 6 mph, and 11 mph. The input pulses p1 or p2 to the 0.1 acre counting circuit may be of variable amplitude and of variable width and are applied to an astable, or monostable multivibrator MONO which derives fixed width output pulses p3 at the same frequency as the input ground speed pulses. Monostable multivibrator MONO may include two comparators COMP 1 and COMP 2 which are turned on alternately and an RC circuit which establishes the multivibrator time constant and includes a timing capacitor C2 which is charged through a resistance R7 in series with a PW CAL potentiometer that is accessible to the combine operator and permits selective variation of the width of the multivibrator output pulses p3 to thereby compensate for differences in transmission gear ratios or in wheel size or tire size in different models of implements.

COMP 1 is normally biased to have a high, or logic 1 output which is applied to timing capacitor C2 to maintain C2 charged. The high output of COMP 1 is also applied to the inverting input of COMP 2 so that the output of COMP 2 is normally low, or logic 0. A positive voltage applied to the inverting input of COMP 1 is derived at the junction between two resistances R1 and R2 connected in series between positive voltage source +V and ground. However, the non-inverting input of COMP 1 is normally maintained at a potential more positive than its inverting input and which is derived at the junction between two resistances R3 and R4 comprising a voltage divider connected between source +V and the output of COMP 2, thereby biasing COMP 1 to a high output when no input pulses are present. Each ground speed pulse p1 or p2 is applied to the inverting input of COMP 1 and triggers it to low, or logic 0 output, thereby discharging timing capacitor C2.

The logic 0 output from first stage comparator COMP 1 is applied to the inverting input of second stage comparator COMP 2 and triggers it to the opposite state with logic 1 output which forms the leading edge of the multivibrator output pulse p3. The high, or logic 1 output from COMP 2 is fed back over conductor 17 and through resistance R4 to the non-inverting input of COMP 1. The output of COMP 1 is now floating, and timing capacitor C2 begins to charge from the voltage souce +V through resistance R7 in series with the PW CAL potentiometer. After timing capacitor C2 has charged to a predetermined potential, second stage comparator COMP 2 is triggered to the opposite state so that its output becomes logic 0 to thereby terminate the output pulse p3 from the multivibrator. The logic 0 output from COMP 2 is also fed back over conductor 17 to the non-inverting input of COMP 1, whereby both inputs of COMP 1 are again in their initial state.

It will be appreciated that the output pulses p3 from monostable multivibrator MONO are of a fixed width determined by the setting of potentiometer PW CAL and are at the frequency of the input impulses p1 or p2. A calibration point terminal CAL POINT is provided at the output of multivibrator MONO, and the fixed width pulses p3 are schematically shown for combine speeds of one mph, six mph, and eleven mph. Since the mutivibrator output pulses p3 are of fixed width, the percent on-time of the wave form at terminal CAL POINT is proportional to combine ground speed, and it will be noted that at eleven miles per hour the input pulse frequency is sufficiently high so that comparator COMP 2 is on continuously, i.e., has 100 percent on-time.

The acre indicating system of the invention may be used on different vehicular farm implements which have different final drive stages, transmission gear ratios, or different tire sizes. As a result, the number of input pulses p1 or p2 per foot of displacement of a combine might vary over a relatively wide range, for example, from ten to twenty-five pulses per foot of travel. Potentiometer PW CAL permits calibration of the acre counting circuit by selective variation of the width of pulses p3 to compensate for such differences in gear ratio and wheel and tire size so that COMP 2 has zero percent on-time when the vehicular implement is at standstill, has 100 percent on-time at a predetermined speed such as eleven mph, and has percentage on-times that vary linearly between such lower and upper limits with change in ground speed.

The fixed width pulses p3 from multivibrator MONO are applied to an integrating circuit and charge an integrator capacitor C3 through the series arrangement of a diode D2, an integrating resistance R10, and a 0.1 acre calibration potentiometer CP. Such integrating circuit, in effect, converts the percent on-time wave form which exists at terminal point CAL POINT into a dc, stepped, positive slope voltage level across capacitor C3 whose instantaneous magnitude is an analog of distance traveled by the combine. The dc voltage that builds up in steps across integrator capacitor C3 as it is charged by uniform width multivibrator output pulses p3 is schematically represented in the drawing. The instantaneous magnitude of the stepped dc voltage built up across integrator capacitor C3 is representative of forward displacement, or feet traveled, and the instantaneous average slope of the stepped curve is dependent upon the instantaneous ground speed of the combine.

The acre indicator of the invention preferably provides an output pulse to advance an electromagnetic register EMC each time the combine has harvested 0.1 acre. Since an acre equals 43,560 square feet, 0.1 acre equals 4356 square feet, and a combine will harvest 0.1 acre, or 4356 square feet, when it travels a distance in feet equal to 4356 divided by width of cut by the combine in feet. The area indicating circuit of the invention electronically multiplies the analog signal on integrator capacitor C3 representative of feet of combine travel by a reference signal indicative of combine header width in feet derived at the wiper of a FEET OF CUT potentiometer to achieve a result of square feet (in 0.1 acres) harvested by the combine.

Integrator capacitor C3 is connected to the inverting input of an operational amplifier comparator COMP 3 and, in effect, counts the multivibrator output pulses p3, which number of pulses is proportional to forward distance traveled by the combine. Comparator COMP 3 provides an output pulse when integrator capacitor C3 has accumulated a number of pulses representative of that forward travel which, when multiplied by header width in feet, equals 4356 ft$^2$, or 0.1 acre. A trigger reference voltage which is an inverse function of combine header width is derived at the wiper of FEET OF CUT potentiometer and applied to the non-inverting input of comparator COMP 3. The FEET OF CUT potentiometer is connected in series with two resistance R14 and R15 between voltage source +V and ground, and the combine operator can adjust the potentiometer wiper to a setting representative of the combine header width and thereby select the trigger potential at the non-inverting input of COMP 3. Such trigger potential for COMP 3 is indicated by the ordinate of the dashed line bearing the legend HEADER CUT WIDTH VOLTAGE on the schematic representation of the step build-up of voltage with time. Comparator COMP 3 normally provides a logic 1 output and is triggered to the opposite state to provide a logic 0 output when capacitor C3 has accumulated a number of pulses p3 representative of that number of feet of combine travel which, when multiplied by the combine header width, equals 43560 ft$^2$/10, or 0.1 acre. It will be apparent that, for each magnitude of header width: (1) the number of feet of combine travel to harvest 0.1 acre is known (i.e., equals 4356/header width); (2) the voltage built up on capacitor C3 after this number of feet of combine travel is readily determined since C3 counts the number of pulses p3 and such number of pulses is proportional to combine travel; and (3) the trigger potential for COMP 3 (i.e., HEADER CUT WIDTH VOLTAGE) derived from FEET OF CUT potentiometer must equal this voltage built up on C3 in order to provide a 0.1 acre output signal from COMP 3. Comparator COMP 3, in effect, performs an analog multiplication of the feet of travel signal on integrator capacitor C3 by the header width signal from the FEET OF CUT potentiometer.

The negative-going logic 0 output transition from COMP 3 is ac coupled through a capacitor C4 to a "0.1 acre count and reset" monostable multivibrator including an operational amplifier comparator COMP 4 which receives such transition on its inverting input and, in response thereto, generates a uniform width pulse p5 of relatively long duration that advances electromagnetic register EMC one count. The inverting input of comparator COMP 4 is coupled to the junction between two resistances R16 and R17 connected in series between the source +V and ground so that COMP 4 is normally biased to have a logic 0 output. The negative-going transition from the output of COMP 3 triggers comparator COMP 4 to the opposite state and provides logic 1 output which forms the leading edge of the "one pulse per 0.1 acre" pulse p5. The logic 1 output from COMP 4 is fed back over a lead 31 and through a resistance R18 to the base of a NPN reset transistor T1 connected in shunt to integrator capacitor C3 and turns T1 on to discharge capacitor C3 to ground and thus reset the integrator to its initial state in preparation for accumulating uniform width pulses p3.

Positive-going output pulse p5 from COMP 4 is also coupled through a resistance R19 to the base of a driver transistor T2 to turn it on. The emitter of T2 is grounded and its collector is connected to one side of the operating coil SC of electromagnetic register EMC. The other side of operating coil SC is connected to a positive voltage source +BATT through a diode D4 and a switch (not shown) controlled by the combine header clutch so that the switch is open to remove the source +BATT and thus inhibit counting by register EMC when the header clutch is not engaged. The voltage source +BATT is also surge suppressed by a zener diode ZD1 and used as an input to a conventional voltage regulator REG shown in block form which provides the potential source +V. Energization of operating coil SC advances the count indicated on electromagnetic register EMC one count to thereby update the acreage shown on the five dials of the register EMC.

The positive-going output from COMP 4 is also coupled through a timing capacitor C5 in series with a resistance R20 to the non-inverting input of COMP 4 and raises it to a potential more positive than the inverting input. The output of COMP 4 thus remains logic 1 until the output of COMP 3 again goes to logic 1 and timing capacitor C5 charges from potential source +V through resistances R21 and R22 until the inverting input to COMP 4 is again more positive than its non-inverting input to terminate the 0.1 acre output pulse, thereby providing a relatively long 0.1 acre output pulse p5 from COMP 4 of sufficient duration to assure advance of electromagnetic register EMC one count. Register EMC is preferably of the decimal system type having five rotatable dials each of which represents one order of a decimal notation, and energization of coil SC advances the tenths dial one count.

The embodiments of the invention in which an exclusive property or privilege is claimed are defined as follows:

1. A system for indicating the area traversed by a vehicular implement comprising, in combination,
   pulse generating means for deriving a train of ground speed pulses at a frequency which is a function of the ground speed of said vehicle,
   means including a resistance in series with a capacitor for integrating said ground speed pulses to derive a positive slope analog signal whose instantaneous magnitude is a function of the distance traveled by said implement,
   means for providing a reference signal whose magnitude is an inverse function of the width of path traversed by said implement,
   a comparator for comparing the magnitude of said analog signal to said width reference signal and for providing an output pulse when the former becomes equal to the latter, whereby said output pulse indicates that said vehicle has traversed an area equal to said distance traveled multiplied by said width of path,
   means responsive to said output pulse for discharging said capacitor, and
   a counter for counting the number of output pulses as an indication of the area traversed by said implement.

2. A system in accordance with claim 1 and including means to selectively vary the width of said ground speed pulses to thereby compensate for differences in implement gear ratio or tire size.

3. A system in accordance with claim 1 and including a fixed width pulse generator between said ground speed pulse generating means and said integrating means for deriving pulses having fixed width at the frequency of said ground speed pulses and wherein said integrating means receives said fixed width pulses as an input.

4. A system in accordance with claim 3 and including means accessible to the implement operator for selectively adjusting the width of said fixed width pulses to thereby compensate for differences in implement tire size or gear ratio.

5. A system in accordance with claim 3 or 4 wherein said fixed width pulse generator comprises a monostable multivibrator.

6. A system in accordance with claim 5 wherein said monostable multivibrator has an RC circuit which establishes the multivibrator time constant and includes a timing capacitor in series with a potentiometer which is accessible to the implement operator and adjustable to selectively vary said time constant and the width of the multivibrator output pulses which are transmitted to the integrating means.

7. A system in accordance with claim 1, 2, 3, or 4 wherein said width reference signal providing means is selectively adjustable by the implement operator to vary the magnitude of said width reference signal.

8. A system in accordance with claim 7 wherein said comparator comprises an operational amplifier which has said analog signal applied to one input and said width reference signal applied to its other input, and said width reference signal deriving means includes a potentiometer that is adjustable to selectively vary the magnitude of said width reference signal.

9. A system in accordance with claim 7 wherein said implement is an agricultural combine and the magnitude of said width reference signal is indicative of the width of cut by said combine.

10. A system for indicating the area farmed by a vehicular agricultural implement comprising, in combination, means for generating a succession of ground speed pulses at a frequency which is a function of the ground speed of said implement, a monostable multivibrator for deriving pulses of fixed width at the frequency of said ground speed pulses, an integrator including a resistance in series with an integrator capacitor receiving said fixed width pulses as an input for counting said pulses and deriving a unidirectional positive slope analog signal whose instantaneous magnitude is indicative of the forward travel of said implement, means accessible to the implement operator for providing a width reference voltage signal whose magnitude is an inverse function of the width of path of said implement and being selectively adjustable to vary said magnitude, a comparator for comparing said analog signal to said width reference signal and for providing an output pulse when the former becomes equal to the latter, whereby said output pulse indicates that said implement has farmed an area equal to said distance traveled multiplied by said implement width, means responsive to the output pulse from said comparator for discharging said integrator capacitor, and a counter for accumulating the number of output pulses from said comparator as an indication of the area farmed by said implement.

11. A system in accordance with claim 10 and including means accessible to the implement operator for selectively adjusting the width of said fixed width pulses to thereby compensate for differences in implement tire size or gear ratio.

12. The method of indicating the area traversed by a vehicular implement comprising the steps of generating a train of ground speed pulses at a frequency which is a function of the ground speed of said implement, integrating said ground speed pulses to derive a positive slope analog electrical signal whose instantaneous magnitude is representative of the distance traveled by said implement, providing a reference signal whose magnitude is an inverse function of the width of said implement, comparing the magnitude of said analog signal to said reference signal and providing an output pulse when the former becomes equal to the latter, whereby each output pulse indicates that said implement has traversed an area equal to said distance traveled multiplied by said width, repetitively performing said integrating step starting from zero each time said output pulse occurs, and counting the number of said output pulses as an indication of area traversed by said implement.

13. The method of claim 12 and including the additional step of deriving a pulse of fixed width from each ground speed pulse and wherein said integrating step accumulates said fixed width pulses.

14. The method of measuring the area traversed by a vehicular implement comprising the steps of generating a train of ground speed pulses at a frequency which is a function of the ground speed of the implement, squaring said pulses to provide fixed width pulses therefrom, accumulating said fixed width pulses to derive an analog electrical signal having a positive slope and whose instantaneous magnitude is a function of the distance traveled by said implement, providing a reference voltage whose magnitude is an inverse function of the width of said implement, deriving an output signal each time the magnitude of said analog signal becomes equal to said reference signal, whereby said output signal is indicative that said implement has traversed an area equal to said distance traveled multiplied by said width, repetitively performing said accumulating step beginning from zero each time said output signal occurs, and counting the number of said output signals as an indication of the area traversed by said implement.

* * * * *